(12) United States Patent
Evennou et al.

(10) Patent No.: US 8,908,552 B2
(45) Date of Patent: Dec. 9, 2014

(54) LOCATING SENSORS OF A NETWORK OF WIRELESS SENSORS

(75) Inventors: Frederic Evennou, Grenoble (FR);
David Cibaud, St Egreve (FR)

(73) Assignee: France Telecom, Paris (FR)

( * ) Notice: Subject to any disclaimer, the term of this patent is extended or adjusted under 35 U.S.C. 154(b) by 199 days.

(21) Appl. No.: 13/638,521

(22) PCT Filed: Mar. 30, 2011

(86) PCT No.: PCT/FR2011/050702
§ 371 (c)(1),
(2), (4) Date: Sep. 28, 2012

(87) PCT Pub. No.: WO2011/121234
PCT Pub. Date: Oct. 6, 2011

(65) Prior Publication Data
US 2013/0021939 A1    Jan. 24, 2013

(30) Foreign Application Priority Data

Mar. 31, 2010  (FR) ...................................... 10 52435

(51) Int. Cl.
*H04L 1/00* (2006.01)
*H04L 12/26* (2006.01)
*H04L 12/28* (2006.01)

(52) U.S. Cl.
USPC ......................................... 370/252; 370/254

(58) Field of Classification Search
CPC ......... H04L 47/10; H04L 43/50; H04L 41/12; H04L 45/02
USPC ................................................ 370/252, 254
See application file for complete search history.

(56) References Cited

U.S. PATENT DOCUMENTS

2009/0128412 A1    5/2009    Ryu et al.

FOREIGN PATENT DOCUMENTS

JP    2006090868    4/2006

OTHER PUBLICATIONS

International Search Report and Written Opinion dated May 23, 2011 for corresponding International Application No. PCT/FR2011/050702, filed Mar. 30, 2011.
Evennou et al., "Map-Aided Indoor Mobile Positioning System Using Particle Filter", Wireless Communications and Networking Conference, 2005 IEEE New Orleans, LA, USA Mar. 13-17, 2005, Piscataway, NJ, USA, IEEE, vol. 4. pp. 2490-2494, XP010791567.
Preliminary Report on Patentability and English translation of the Written Opinion dated Oct. 2, 2012 for corresponding International Application No. PCT/FR2011/050702, filed Mar. 30, 2011.

*Primary Examiner* — Ronald Abelson
(74) *Attorney, Agent, or Firm* — David D. Brush; Westman, Champlin & Koehler, P.A.

(57) ABSTRACT

A method and apparatus are provided for locating the positions of sensors of a network of sensors suitable for communicating with one another by radio connection. The method is suitable for receiving, from sensors of the network of sensors, measurements of relative distances between sensors of the network; for calculating a topology for the network of sensors from the received distance measurements, the topology comprising nodes representative of sensors of the network of sensors; and for determining absolute positions for the sensors by anchoring the calculated topology in an absolute frame of reference on the basis of constraints associated with an environment plan of the network of sensors. The invention also provides a locating device implementing the management method.

15 Claims, 5 Drawing Sheets

LOCATING SENSORS OF A NETWORK OF WIRELESS SENSORS

CROSS-REFERENCE TO RELATED APPLICATIONS

This Application is a Section 371 National Stage Application of International Application No. PCT/FR2011/050702, filed Mar. 30, 2011, which is incorporated by reference in its entirety and published as WO 2011/121234 on Oct. 6, 2011, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The disclosure relates to the field of wireless sensor networks (WSNs), i.e. sensors suitable for communicating with one another by radio connection.

The disclosure relates more particularly to locating sensors of a network of sensors.

BACKGROUND OF THE DISCLOSURE

A network of sensors is made up of a plurality of sensors distributed over a geographical area. The function of a sensor is to collect and transmit data relating to a phenomenon that it is desired to study in the geographical area.

It is important to be able to determine the locations of the sensors in the geographical area, firstly for maintenance reasons, and secondly in order to situate where the data has been collected.

Such locating is particularly important when the sensors are movable within the geographical area.

Document US 2009/0128412 describes a method of locating sensors in a network of sensors. For that purpose, each sensor is fitted with a wireless communications module for communicating with the sensors of the network and it includes a distance measuring module.

The distance measuring module is suitable for measuring the distance between the sensor and the other sensors of the network or some of the other sensors of the network. The measured distances are then transmitted to a locating server that determines the absolute locations of the sensors of the network on the basis of the measurements.

That method requires knowledge of the absolute positions of a plurality of sensors, generally of three sensors. Those sensors are referred to as "anchor sensors" and they enable the locating server to determine the absolute positions of the other sensors as a function of the received distance measurements.

By way of example, an anchor sensor may be a fixed sensor of known position or a sensor that includes a module of the global positioning system (GPS) type, or indeed a sensor that includes a position-locating module of some other type and that is suitable for determining the position of the sensor.

For various reasons, it is not always possible to have a sufficient number of anchor sensors for locating the other sensors of the network.

By way of example, these reasons may be installation constraints associated to the site, or indeed problems of energy consumption.

For example, in an application to locating a set of fire-fighters operating at the scene of a fire, with each fire-fighter being fitted with a sensor, all of the sensors are movable. There is no fixed sensor.

Installing position-locating modules on the sensors that are capable of determining their positions and of returning determined coordinates is expensive.

There therefore exists a need for a solution that is simple and inexpensive for locating the positions of sensors in a network of sensors and without requiring the use of anchor sensors.

SUMMARY

An exemplary embodiment of the invention provides a locating method for locating sensors of a network of sensors suitable for communicating with one another by radio connection, the method being characterized in that it comprises the following steps:

receiving from sensors of the network of sensors measurements of relative distances between sensors of the network;

calculating a topology for the network of sensors from the received distance measurements, said topology comprising nodes representative of sensors of the network of sensors; and determining an absolute position for at least one sensor of the network by anchoring the calculated topology in an absolute frame of reference on the basis of constraints associated with an environment plan of the network of sensors.

The absolute position is thus obtained by moving the topology in the environment plan so that the topology is inserted in the plan while taking account of constraints of the plan. The constraints associated with the environment plan, such as positions that are authorized or not authorized, and paths that are authorized for the sensors, thus make it possible to position the topology on the environment plan. There is thus no need to use anchor sensors.

In a particular implementation of the locating method, the constraints are specified in an environment graph comprising a set of possible absolute positions for a sensor in the environment plan. The environment graph characterizes the constraints of the environment plan.

By way of example, the constraints are authorized positions for the sensors. The environment graph makes it possible for all of the constraints to be represented in simple and complete manner.

According to a particular characteristic of the locating method, the step of determining by anchoring comprises:

a step of selecting a reference node from among the nodes of the topology;

a step of selecting anchor points from among the absolute positions of the environment graph;

a step of determining, for each anchor point, a first movement vector and an associated second movement vector, the first movement vector being calculated as a function of the distance between said reference node and the anchor point under consideration;

a step of selecting a first movement vector and an associated second movement vector as a function of the first and second vectors as determined and as a function of a first criterion; and a step of applying the first movement vector to all of the nodes and of applying a second movement vector to the nodes of the topology other than the reference nodes.

The first movement vector makes it possible to determine the absolute position of the reference node. The second movement vector makes it possible to determine the positions of the other nodes while conserving the topology.

The number of anchor points that are selected is a parameter that serves to achieve a compromise between the desired level of accuracy and the amount of calculation that is performed. Selecting this parameter makes it possible for the method to be adapted simply and quickly to the network of sensors in use.

This type of filtering, referred to as particle filtering, enables positions to be located accurately.

The use of an environment graph makes it possible to determine the expected positions of the sensors, thereby limiting the number of anchor points that need to be used.

In a particular implementation of the locating method, the first movement vector and the associated second movement vector are selected from the first and second vectors as determined.

The various possible configurations are evaluated and one of the configurations is retained.

In a particular implementation of the locating method, the first criterion is a matching score between the environment graph and absolute positions of the nodes obtained by applying first and second vectors as determined; said matching score corresponding to the sum of the distances between the nodes and points of the environment graph.

This criterion makes it possible to obtain an accurate location.

In another particular implementation of the locating method, the first selected movement vector is determined as a function of the distance between the reference node and a barycenter associated with the first movement vectors as determined, and the associated second selected movement vector is selected as a function of a mean angle of rotation.

Averaging a plurality of positions that are considered as being likely makes it possible to increase the stability of the absolute position.

In another particular implementation of the locating method, weighting values are associated with the anchor points, and the first and second movement vectors are selected as a function of the weighting values.

In another particular implementation of the locating method, the method further includes a step of updating at least one of the weighting values of the anchor points.

In another particular implementation of the locating method, the steps of receiving measurements, of calculating a topology, and of determining an absolute position are reiterated with the updated weighting values.

Thus, when several iterations of the method are performed, the accuracy of the estimated absolute position is increased.

Reiteration makes it possible to re-evaluate the positions of the sensors and thus makes it possible to locate the positions of the sensors in real time.

In another particular implementation of the locating method, the first movement vector is a translation vector and the second movement vector is a rotation vector and/or an orthogonal symmetry vector.

In another particular implementation of the locating method, determining the second movement vector for an anchor point comprises:
 a step of positioning the reference node on said anchor point;
 a step of calculating an anchoring score representative of a distance between the nodes and the environment graph for a plurality of angles of rotation of the nodes about the reference node and/or by symmetry; and
 a step of selecting an anchoring score from the scores obtained and of selecting the associated angle of rotation.

In another particular implementation, the locating method further includes a step of selecting information relating to the absolute position determined for a sensor; and a step of transmitting said information to said sensor.

An embodiment of the invention also provides a device for locating sensors of a network of sensors suitable for communicating with one another by radio connection, the device being characterized in that it comprises:
 receiver means for receiving, from sensors of the network of sensors, measurements of relative distances between sensors of the network;
 a module for calculating a relative topology for the network of sensors from the received distance measurements, said topology comprising nodes representative of sensors of the network of sensors; and
 a module for determining an absolute position of at least one sensor by anchoring the calculated topology in an absolute frame of reference on the basis of constraints associated with an environment plan of the network of sensors.

An embodiment of the invention also provides a system comprising a set of sensors suitable for communicating with one another by radio connection together with a device as described above.

Finally, an embodiment of the invention provides a computer program product including instructions for implementing the steps of the locating method as described above, when loaded and executed by a processor.

BRIEF DESCRIPTION OF THE DRAWINGS

Other features and advantages appear from the following description of implementations given as non-limiting examples and with reference to the accompanying drawings, in which.

DETAILED DESCRIPTION OF ILLUSTRATIVE EMBODIMENTS

An implementation of an exemplary embodiment of the invention is described below with reference to FIGS. 1 to 5.

Figure 1:
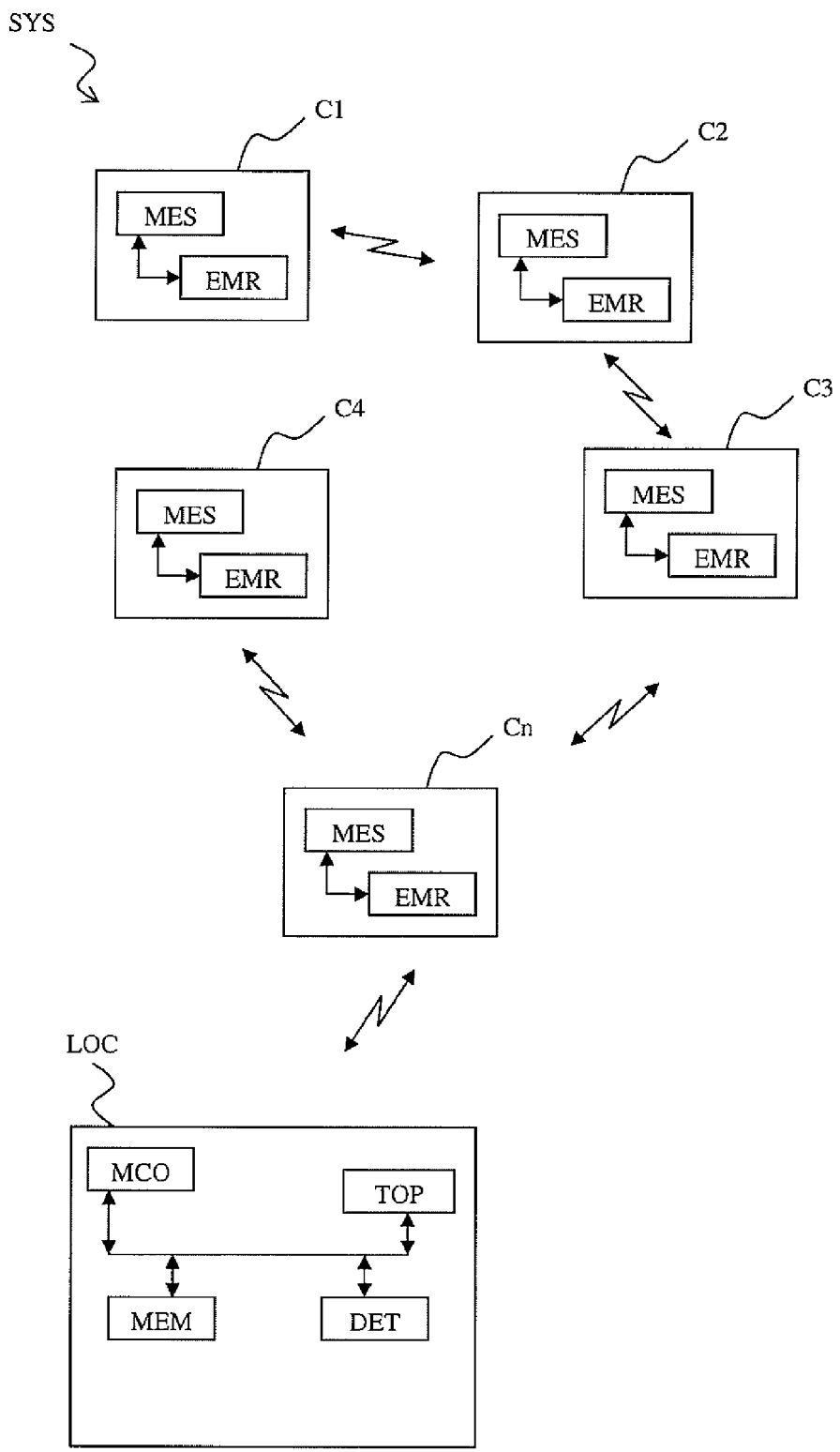
FIG. 1 is a diagram showing a locating system in an embodiment of the invention.

With reference to FIG. 1, a system SYS has N sensors C1, C2, C3, . . . , Cn and a locating device LOC.

The N sensors form a network of sensors.

Each of the sensors C1, C2, C3, ... includes a measurement module MES suitable for measuring the distances between the sensor and the neighboring sensors, and a transceiver module EMR suitable for transmitting the measured distances either to a neighboring sensor or to a locating device LOC over a wireless connection, e. g. a connection of the WiFi type or a connection of the Zigbee or Wavenis type.

In known manner, Zigbee or Wavenis technologies are low-consumption technologies.

The measurements made by a sensor are transmitted to the module LOC either directly or via one or more sensors.

By way of alternative, the measurements made by a sensor may be transmitted to a transmitter module (not shown), generally referred to as a "sink", via one or more sensors. The transmitter module is suitable for relaying the data it received to the locating module LOC over a wired or wireless connection.

The sensors C1, C2, C3, ..., Cn are also suitable for relaying a distance measurement received from another sensor.

By way of alternative, the sensors C1, C2, C3, ..., Cn are also suitable for taking measurements such as taking meter readings, and for relaying them.

The locating device LOC comprises a communications module MCO suitable for receiving relative distance measurements from the sensors, a topology module TOP, and a determination module DET for determining the absolute position of a sensor.

The locating device LOC also includes a memory MEM in which there is stored a plan PE of the surrounding environment.

In the implementation described, the plan PE is the plan of a building.

As an alternative, the plan PE may for example be a road map or a town plan.

The memory MEM also includes an environment graph GP representing the possible positions of sensors in the plan PE.

The environment graph GP comprises a set of points interconnected by arcs.

Figure 2:
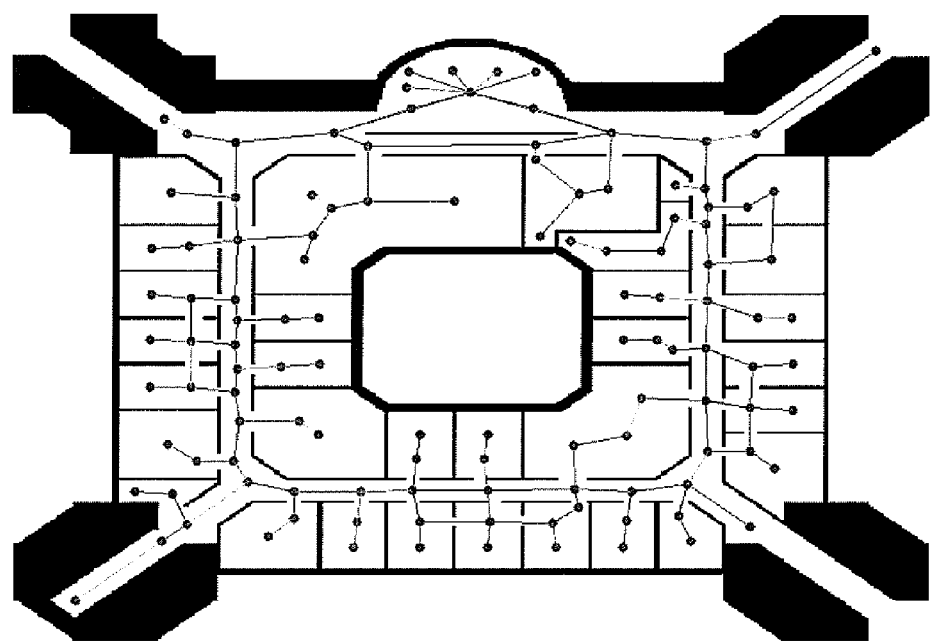
FIG. 2 is an example of an environment graph in an implementation of an embodiment of the invention.

FIG. 2 shows an example of an environment graph GP for an environment plan PE.

In the implementation described, the sensors are capable of moving within the environment plan PE.

By way of alternative, some of the sensors may be fixed.

A first implementation of the locating method as implemented in the system SYS is described below with reference to FIGS. 3 to 5.

Figure 3:
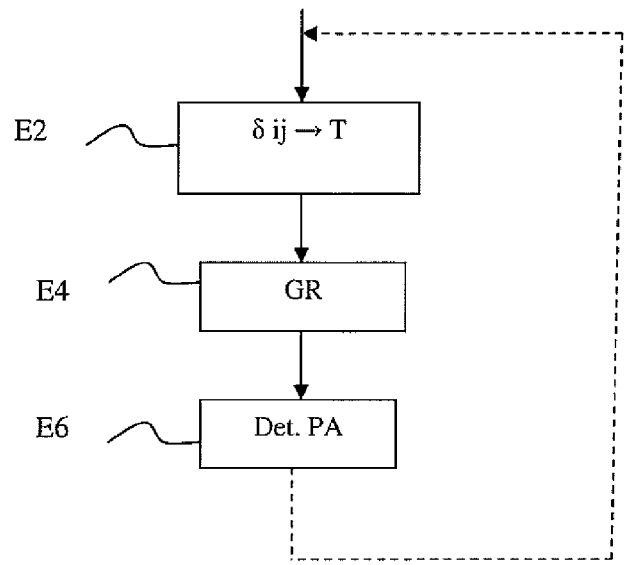
FIG. 3 is a flow chart showing the main steps of a locating method.
Figure 4:
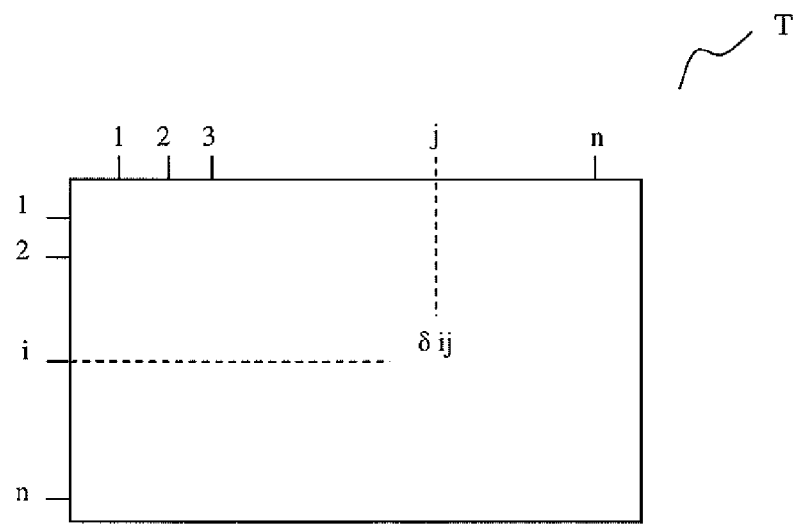
FIG. 4 shows an example of a table containing distance measurements coming from the sensors in an implementation of an embodiment of the invention.

With reference to FIG. 3, in a step E2, the communications module MCO of the locating device LOC receives distance measurements from the N sensors C1, C2, C3, ..., Cn. These measurements constitute a first set of measurements.

The measured distances are stored on being received in a table T of the memory MEM of the locating device. As shown in FIG. 4, the table T comprises N rows of N columns. An element $\delta_{ij}$ of the table T is situated at row i and at column j and corresponds to the relative distance between the sensor i and the sensor j as measured by the sensor Ci.

Step E2 is followed by a step E4 in which the topology module TOP of the locating device LOC calculates a relative topology for the network of sensors on the basis of the distances that have been received and stored in the table T.

For example, the topology is calculated by using the multidimensional scaling (MDS) algorithm.

By way of example, it is possible to use the MDS-MAP algorithm.

By way of example, the MDS and MDS-MAP algorithms are described in the document "Sensor network locating from local connectivity: performance analysis for the MDS-MAP algorithm", August 2009 by S. Oh, A. Karbasi, A. Montanari.

The topology obtained during step E4 is presented in the form of a positioning graph GR.

Figure 5:
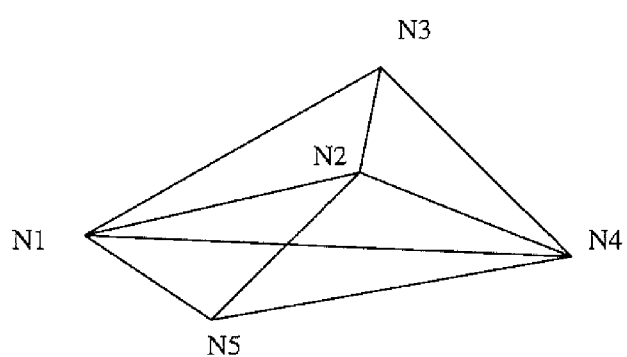
FIG. 5 shows an example of a positioning graph in an implementation of the invention.

FIG. 5 shows an example of a positioning graph GR for a system SYS having five sensors. The nodes N1, N2, ..., N5 represent the relative positions of the sensors, i.e. their positions relative to one another.

The step E4 is followed by a step E6 during which the determination module DET of the locating device LOC determines an absolute position for one or more sensors by anchoring the topology as calculated in an absolute frame of reference on the basis of constraints associated with the environment plan PE for the network of sensors.

By way of example, the determination step E6 is performed by a particle filtering technique using M particles.

By way of alternative, the determination step E6 may be performed by Kalman filtering.

In a particular implementation, the steps E2 to E6 are reiterated. Reiteration serves to take account of the sensors moving in the network and to make them correspond with the structure of the environment.

Figure 6:
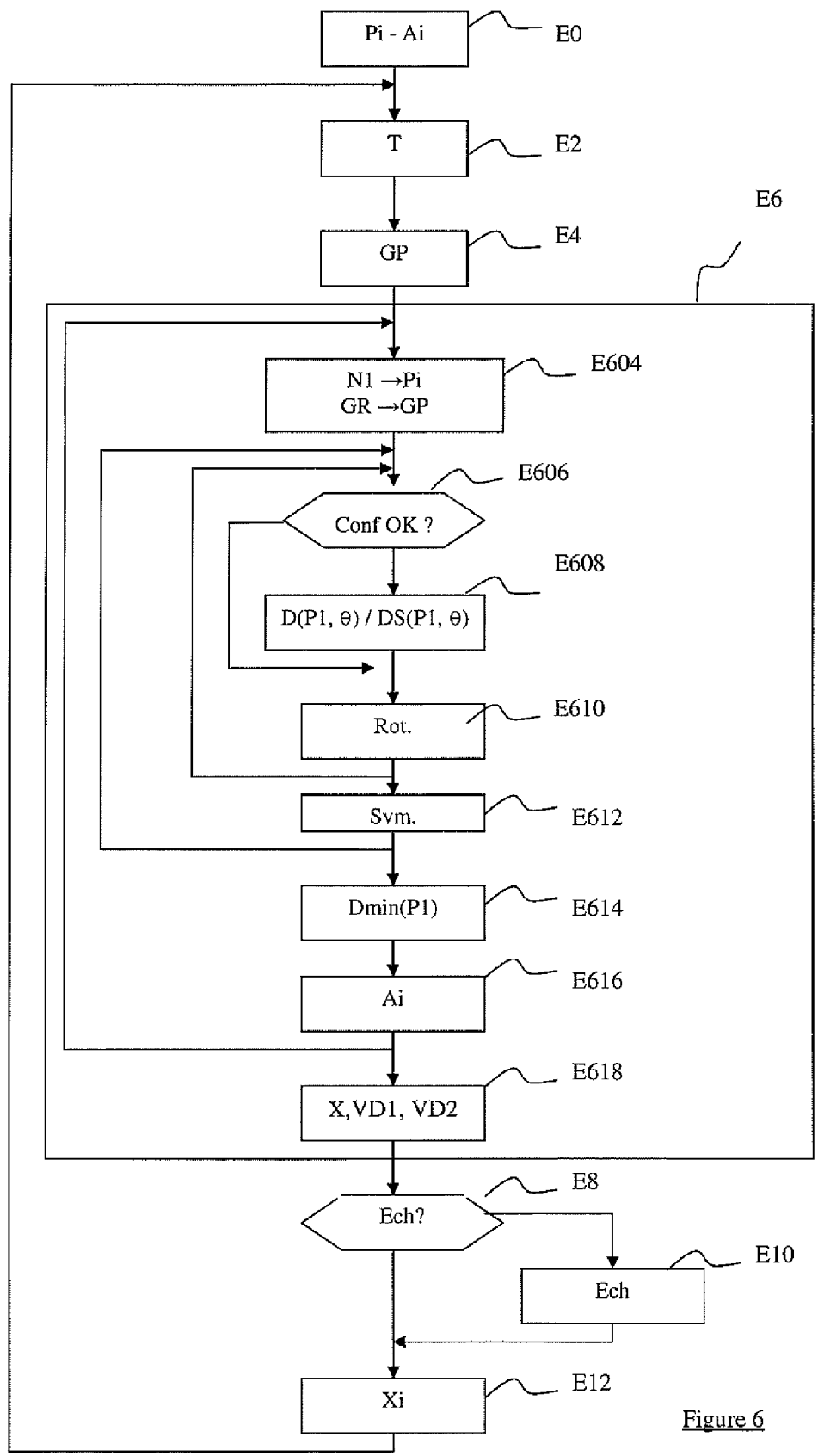
FIG. 6 is a flow chart showing in detail the various steps of a locating method implemented in a locating system in an embodiment of the invention.

A detailed implementation of the locating method is described below with reference to FIG. 6 in which the anchoring is performed by particle filtering.

During a prior step E0, particles Pi are located on the environment graph GP. The number M of these particles is selected as a function of the application, of the locating accuracy desired, and of calculation time constraints. The positions of particles are determined so that the particles Pi are distributed over the environment graph GP. Each particle Pi is represented by its position Xpi on the environment graph GP. A weighting value Ai is also associated with each particle Pi. As described below in the description, the weighting value Ai represents the probability that the particle Pi represents a determined reference node of the sensor network. During this step E0, the probabilities Ai are equally probable.

The particles Pi represent anchor points.

In the implementation described herein, the number M of particles is 300 and the weighting value or probability Ai is 1/300.

Also during the step E0, a sensor is selected from among all of the sensors to be a reference sensor. By way of example, this sensor may be selected randomly.

For the presently-considered application of locating sensors in a building, the number 300 makes it possible to obtain good accuracy. Having a number M that is too small reduces accuracy. Having a number M that is greater increases the amount of calculation that needs to be performed.

A first set of relative distance measurements is stored in the table T during the step E2, and a positioning graph GR representing the topology of the network of sensors is calculated during the step E4.

The node N1 of the positioning graph GR and corresponding to the reference sensor of the positioning graph GR is considered as being the reference node.

Determination step E6, following step E4, comprises substeps E604 to E618.

During the substep E604, the positioning graph GR is positioned on the environment graph GP so that the reference node N1 is positioned on the particle P1. In other words, the position of the reference node N1 is the position X1 of the particle P1, and the positions of the other nodes of the network are recalculated as a function of the position of the node N1.

This operation consists in moving the positioning graph GR in translation. It consists in applying a movement vector that is a translation vector to the nodes Ni of the sensor network. This movement vector is represented by a first movement vector.

During a substep E606, the resulting configuration is tested.

If, following this movement, nodes of the positioning graph GR are situated outside the environment plan PE, the configuration is rejected.

Else, i.e. if all of the nodes of the positioning graph GR are situated inside the environment plan PE, then the overall distance between the positioning graph GR and the environment graph GP is calculated (substep E608).

For example, the overall distance as calculated is the sum of the distances between each node N1 of the positioning graph GR and the environment graph GP.

The distance between a node N1 and the environment graph GP may for example be the distance between the node N1 and the nearest point on the environment graph GP.

By way of alternative, this distance takes account of characteristics of the environment plan (e.g. avoiding walls of the building).

During a step E610, the positioning graph GR is then turned through an angle θ about the node N1, i.e. the particle P1.

By way of example, the angle θ is 5 degrees.

This amounts to applying a second movement vector to those nodes of the topology that are not the reference node. This second movement vector is a rotation vector through an angle θ.

The substeps E606 to E610 are then reiterated with this new positioning of the positioning graph GR.

The step E610 is reiterated for all angles θ in the range 0° to 360°.

This produces distances D(P1,θ) corresponding to the second movement vectors V(P1,θ).

During a substep E612, the positioning graph GR is made orthogonally symmetrical relative to an axis, e.g. a vertical axis, passing through the node N1.

The substeps E606 to E610 are reiterated for all of the values of the angle θ lying in the range 0° to 360°.

This obtains distances DS(P1,θ) corresponding to second movement vectors VS(P1,θ). Here VS represents a movement vector that is the sum of an orthogonal symmetry vector and a rotation vector through an angle θ.

During a step E614, a distance Dmin(P1) is determined. The distance Dmin(P1) is the smallest of the set of distances calculated for the particle P1, i.e. the smallest of the distances D(P1,θ) and the distances DS(P1,θ).

The distance Dmin(P1) is the distance determined for the particle P1 and it is associated with the movement vector V(P1,θ) or VS(P1,θ). The vector V(P1,θ) or VS(P1,θ) represents a second movement vector.

The substeps E604 to E614 are then reiterated with the (M−1) other particles.

This produces M distances Dmin(Pi), M first movement vectors, and M associated second movement vectors.

During a substep E616, the probability value Ai associated with each particle Pi is recalculated. The calculated probability value Ai may be obtained for example using the formula:

$$Ai = Ai \exp(-D\min(Pi)/2\sigma^2)$$

where σ is a predetermined threshold.

By way of alternative, another relationship associating a probability as a function of the distance between the environment graph and the topology of the network of sensors may be used.

During a step E618, the most probable position X for the reference node N1 is determined.

In the implementation described, the most probable position X for the reference node N1 is the barycenter of the set of weighted particles.

By way of alternative, the most probable position for the reference node N1 may be the barycenter of the set of particles each having a probability Ai that is greater than a predetermined threshold.

Also by way of example, the most probable position X for the reference node N1 is the position Xi for which the probability Ai is the greatest from among the probabilities Ai(Pi).

Also by way of alternative, no account is taken of weighting values. The weighting values Ai then serve solely for selecting particles for the following iterations.

Also during the step E618, a first movement vector VD1 and a second movement vector VD2 are estimated. The first movement vector VD1 corresponds to moving the reference node N1 in translation between its initial position and the position X. The second movement vector VD2 corresponds to turning the position graph GR and optionally to applying an orthogonal symmetry.

The step E6 is followed by a step E8 during which it is verified that there is no degeneration of the filter. During this step it is verified that the reciprocal of the sum of the squares of the Ais remains greater than a predetermined threshold.

If this condition is not satisfied, a sampling step E10 is triggered in order to bring the particles of the smallest probabilities Ai onto those having the greatest probabilities.

During the step E12, a new position Xi is calculated for each of the particles Pi (position drawn randomly, as a function of the preceding position, and with the constraint of remaining on the positioning graph GR).

In the implementation described, the steps E2 to E12 are then reiterated with a new set of measurements, and while using the remaining particles.

Figure 7:
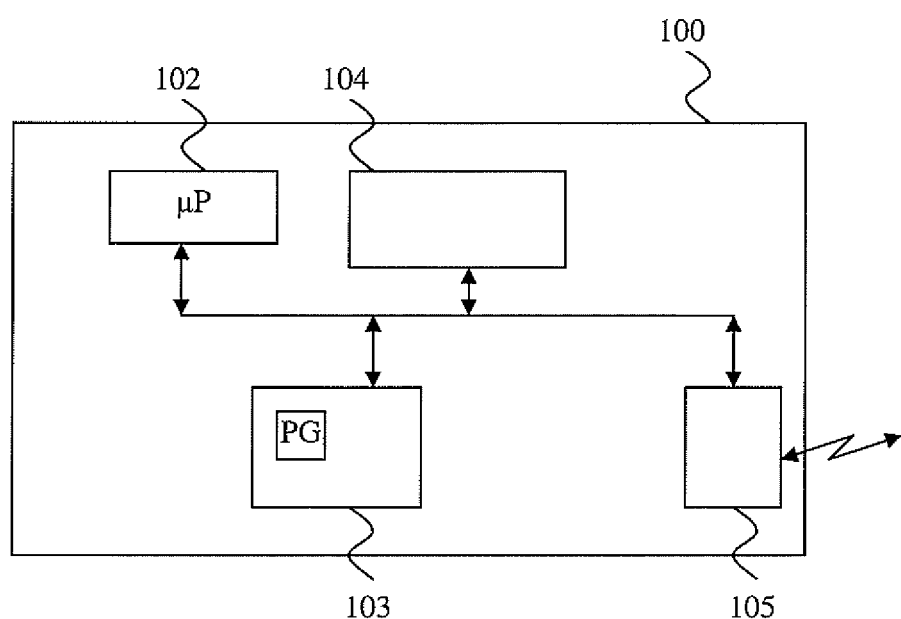
FIG. 7 is a block diagram representing a device suitable for performing the steps of a locating method in an embodiment of the invention.

In a particular embodiment shown in FIG. 7, a locating device implementing a locating method is constituted, for example, by a PC type computer 100 that comprises in known manner, in particular: a processor unit 102 having a microprocessor; a read only memory (ROM) or an electrically erasable programmable read only memory (EEPROM) 103; a random access memory (RAM) 104; and a communications interface 105 for communication with sensors via wireless link.

The ROM 103 has registers storing a computer program PG including program instructions adapted to implement the steps of the locating method of an embodiment of the invention.

On being switched on, the program PG stored in the EEPROM 103 is transferred to the RAM so that it contains an executable code and registers for storing the variables needed for implementing a step of receiving from sensors of the network of sensors relative distance measurements between the sensors of the network; a step of calculating a topology for the network of sensors on the basis of the received distance measurements, said topology having nodes representative of the sensors of the network of sensors; and a step of determining an absolute position for the sensor by anchoring the calculated topology in an absolute frame of reference on the basis of constraints associated with an environment plan for the network of sensors.

More generally, storage means, readable by a computer or by a microprocessor, optionally incorporated in the device and possibly removable, serve to store a program implementing the steps of a locating method of an embodiment of the invention.

Although the present disclosure has been described with reference to one or more examples, workers skilled in the art will recognize that changes may be made in form and detail without departing from the scope of the disclosure and/or the appended claims.

The invention claimed is:

1. A locating method for locating sensors of a network of sensors suitable for communicating with one another by radio connection, the method comprising the following steps:
   receiving with a locating device from sensors of the network of sensors measurements of relative distances between sensors of the network;
   calculating with the locating device a topology for the network of sensors from the received distance measurements, said topology comprising nodes representative of sensors of the network of sensors;
   determining with the locating device a position of said topology in an environment plan predetermined for the network of sensors, said position taking into account constraints associated with said environment plan; and
   determining with the locating device an absolute position for at least one sensor of the network by according to said position of said topology.

2. A locating method according to claim 1, wherein the constraints are specified in an environment graph comprising a set of possible absolute positions for a sensor in the environment plan.

3. A locating method according to claim 2, wherein the step of determining an absolute position comprises:
   a step of selecting a reference node from among the nodes of the topology;
   a step of selecting anchor points from among the absolute positions of the environment graph;
   a step of determining, for each anchor point, a first movement vector and an associated second movement vector, the first movement vector being calculated as a function of the distance between said reference node and the anchor point under consideration;
   a step of selecting a first movement vector and an associated second movement vector as a function of the first and second vectors as determined and as a function of a first criterion; and
   a step of applying the first movement vector to all of the nodes and of applying a second movement vector to the nodes of the topology other than the reference nodes.

4. A locating method according to claim 3, wherein the first movement vector and the associated second movement vector are selected from the first and second vectors as determined.

5. A locating method according to claim 4, wherein the first criterion is a matching score between the environment graph and absolute positions of the nodes obtained by applying first and second vectors as determined; said matching score corresponding to the sum of the distances between the nodes and points of the environment graph.

6. A locating method according to claim 3, wherein the first selected movement vector is determined as a function of the distance between the reference node and a barycenter associated with the first movement vectors as determined, and the associated second selected movement vector is selected as a function of a mean angle of rotation.

7. A locating method according to claim 3, wherein weighting values are associated with the anchor points, and the first and second movement vectors are selected as a function of the weighting values.

8. A locating method according to claim 7, wherein the method further includes a step of updating at least one of the weighting values of the anchor points.

9. A locating method according to claim 8, wherein the steps of receiving measurements, of calculating a topology, and of determining an absolute position are reiterated with the updated weighting values.

10. A locating method according to claim 3, wherein the first movement vector is a translation vector and the second movement vector is a rotation vector and/or an orthogonal symmetry vector.

11. A locating method according to claim 3, wherein determining the second movement vector for an anchor point comprises:
   a step of positioning the reference node on said anchor point;
   a step of calculating an anchoring score representative of a distance between the nodes and the environment graph for a plurality of angles of rotation of the nodes about the reference node and/or by symmetry; and
   a step of selecting an anchoring score from the scores obtained and of selecting the associated angle of rotation.

12. A locating method according to claim 1, characterized in that it further comprises:
   a step of selecting information relating to the absolute position determined for a sensor; and
   a step of transmitting said information to said sensor.

13. A device for locating sensors of a network of sensors suitable for communicating with one another by radio connection, the device comprising:
   a receiver configured for receiving, from sensors of the network of sensors, measurements of relative distances between sensors of the network;
   a module configured for calculating a relative topology for the network of sensors from the received distance measurements, said topology comprising nodes representative of sensors of the network of sensors; and
   a module configured for determining a position of said topology in an environment plan predetermined for the network of sensors, said position taking into account constraints associated with said environment plan, and determining an absolute position for at least one sensor of the network according to said position of said topology.

14. A system comprising:
   a network of sensors suitable for communicating with one another by radio connection; and
   a device for locating sensors of a network of sensors, the device comprising:
     a receiver configured for receiving, from sensors of the network of sensors, measurements of relative distances between sensors of the network;
     a module configured for calculating a relative topology for the network of sensors from the received distance measurements, said topology comprising nodes representative of sensors of the network of sensors; and
     a module configured for determining a position of said topology in an environment plan predetermined for the network of sensors, said position taking into account constraints associated with said environment plan, and determining an absolute position for at least one sensor of the network according to said position of said topology.

15. A non-transitory computer-readable medium comprising a computer program product recorded thereon and including instructions suitable for implementing a method for locating sensors of a network of sensors suitable for communicating with one another by radio connection, when the instructions are loaded and executed by a processor, wherein the instructions comprise:
   instructions configured to cause the processor to receive from sensors of the network of sensors measurements of relative distances between sensors of the network;
   instructions configured to cause the processor to calculate a topology for the network of sensors from the received distance measurements, said topology comprising nodes representative of sensors of the network of sensors;
   instructions configured to cause the processor to determine a position of said topology in an environment plan predetermined for the network of sensors, said position taking into account constraints associated with said environment plan; and
   instructions configured to cause the processor to determine an absolute position for at least one sensor of the network according to said position of said topology.

* * * * *

UNITED STATES PATENT AND TRADEMARK OFFICE
CERTIFICATE OF CORRECTION

| | | |
|---|---|---|
| PATENT NO. | : 8,908,552 B2 | Page 1 of 1 |
| APPLICATION NO. | : 13/638521 | |
| DATED | : December 9, 2014 | |
| INVENTOR(S) | : Evennou et al. | |

It is certified that error appears in the above-identified patent and that said Letters Patent is hereby corrected as shown below:

In the Claims

Column 9:
Claim 1, line 29, delete "by" in front of the word "according".

Signed and Sealed this
Thirtieth Day of June, 2015

Michelle K. Lee
*Director of the United States Patent and Trademark Office*